United States Patent [19]
Marsico, Jr. et al.

[11] 3,760,084
[45] Sept. 18, 1973

[54] METHOD OF USING 5-AMINO-1-PHENYL OR SUBSTITUTED PHENYL-4-PYRAZOLECARBONITRILES OR CARBOX-AMIDES

[75] Inventors: Joseph William Marsico, Jr., Pearl River, N.Y.; Joseph Peter Joseph, Cliffside Park, N.J.; Leon Goldman, Nauet, N.Y.

[73] Assignee: American Cynamid Company, Stamford, Conn.

[22] Filed: May 1, 1972

[21] Appl. No.: 249,286

[52] U.S. Cl. .............................. 424/273, 260/310 R
[51] Int. Cl. ............................................. A61k 27/00
[58] Field of Search .................. 260/310 R; 424/273

[56] References Cited
UNITED STATES PATENTS

| | | | |
|---|---|---|---|
| 3,169,091 | 2/1965 | Gordon et al. | 260/310 R |
| 3,277,100 | 10/1966 | Dickenson | 260/310 R |
| 3,398,158 | 8/1968 | Fusco et al. | 260/310 R |

Primary Examiner—Stanley J. Friedman
Attorney—Ernest Y. Miller

[57] ABSTRACT

Compositions of matter and method of use of compounds of the formula:

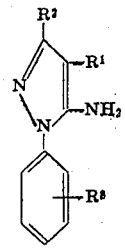

wherein $R^1$ is carbamoyl or cyano, $R^2$ is hydrogen or lower alkyl having one to three carbon atoms and $R^3$ is hydrogen, fluoro, m- and p- chloro, m-bromo, o- and p-methyl and m-nitro. The compounds are useful for meliorating inflammation in warm-blooded animals.

8 Claims, No Drawings

METHOD OF USING 5-AMINO-1-PHENYL OR SUBSTITUTED PHENYL-4-PYRAZOLECARBONITRILES OR CARBOX-AMIDES

DESCRIPTION OF THE INVENTION

This invention relates to new compositions of matter and their use in meliorating inflammation in warm-blooded animals. More particularly, it relates to compositions of 5-amino-1-phenyl-4-pyrazolecarbonitrile or carboxamide and their derivatives and a pharmaceutically acceptable carrier for use as antiinflammatory agents.

The active components of the present compositions may be illustrated by the following formula:

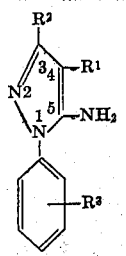

wherein $R^1$ is carbomoyl or cyano, $R^2$ is hydrogen or lower alkyl having one to three carbon atoms and $R^3$ is hydrogen, fluoro, m- and p- chloro, m-bormo, o- and p-methyl and m-nitro, and non-toxic pharmaceutically acceptable acid-addition salts with acids such as, for example, hydrobromic, hydrochloric, phosphoric, sulfuric, citric, tartaric and the like.

The preparation of the active components of the present compositions are described in the chemical literature and in the examples hereinafter.

The 5-amino-1-phenyl-4-pyrazolecarbonitriles or carboxamides of this invention are highly active as antiinflammatory agents in meliorating inflammation in warm-blooded animals. They are useful in doses which range from about 5 to 250 mg. per kilogram per day of warm-blooded animal. The preferred range of dose is usually from 5 to 100 mg. per kilogram per day.

The active components of the present invention are colorless to tan crystalline solids which are soluble in organic solvents such as methanol, ethanol, acetone, benzene, propylene glycol, dichloromethane, and the like, but are only slightly soluble in water. The salts are soluble in water and in hydroxlyic solvents.

For therapeutic administration the active 5-amino-1-phenyl-4-pyrazolecarbonitriles or carboxamides of this invention may be incorporated with excipients and used, for example, in the form of tablets, dragees, capsules, suppositories, liquids, elixirs, emulsions, suspensions, syrups, chocolate, candy, wafers, chewing gum, solutions for parenteral administration, or the like. Such compositions and preparations should contain at least 0.1 percent of active substituted 5-amino-1-phenyl-4-pyrazolecarbonitrile or carboxamide. The percentage in the compositions and preparations may, of course, be varied, and may conveniently be between about 2 and 60 percent or more of the weight of the unit. The amount of active substituted 5-amino-1-phenyl-4-pyrazolecarbonitrile or carboxamide in such therapeutically useful compositions or preparations is such that a suitable dosage will be obtained. This dosage can also be obtained by the use of sustained release preparations. Preferred compositions or preparations according to the present invention are prepared so that a dosage unit form contains between about 1 and about 250 milligrams of the active substituted 5-amino-1-phenyl-4-pyrazolecarbonitrile or carboxamide.

Tablets, pills, dragees, and the like may contain the following: a binder such as gum tragacanth, acacia, corn starch, or gelatin; a disintegrating agent such as corn starch, potato starch, alginic acid, or the like; a lubricant such as stearic acid, magnesium stearate, talc, or the like; a sweetening agent such as sucaryl or saccharin may be added, as well as a flavoring such as peppermint, oil of wintergreen or cherry flavoring.

In determining the acute anti-inflammatory activity of the present compounds Royal Hart, Wistar strain, rats ranging from 80 to 90 g. were used. The rats were fasted overnight prior to dosing but had free access to water. The drugs in aqueous suspension were administered by gavage in a volume of 1.7 ml./50 g. rat (corresponds to hydration volume used by Winter, et al., Proc. Soc. Exp. Biol. Med., 111, 544–547, 1962).

The phlogistic agent used was carrageenin prepared as a sterile 1 percent suspension in 0.9 percent sodium chloride for routine testing. A volume of 0.05 ml. was injected through a 26 gauge needle into the plantar tissue of the right hind paw. Measurements were made 5 hours after drug administration (4 hours after carrageenin challenge) unless otherwise indicated.

Volumes of both the normal and carrageenin inflamed feet were determined. The difference between the two measurements was considered to be the increased edema due to the carrageenin administration. Results were expressed as a C/T efficacy ratio (edema of control animals/edema of treated animals). The following Table I summarizes the results obtained with representative compounds of the present invention.

TABLE I

The effects of anti-inflammatory agents on carrageenin induced edema of the rat paw [1] (pooled data)

| Treatment | Oral dose, mg./kg. | Number rats | Ratio control treated edema [2] |
|---|---|---|---|
| Controls | | 64 | |
| Aspirin | 250 | 32 | 2.8 |
|  | 83 | 32 | 1.4 |
|  | 27 | 32 | 1.2 |
|  | 9 | 32 | 0.9 |
|  | 3 | 32 | 1.0 |
| Phenylbutazone | 250 | 32 | 2.3 |
|  | 83 | 32 | 2.4 |
|  | 27 | 32 | 1.7 |
|  | 9 | 32 | 1.3 |
|  | 3 | 32 | 1.3 |

TABLE I—Continued

| Treatment | Oral dose, mg./kg. | Number rats | Ratio, control/ treated edema [2] |
|---|---|---|---|
| Indomethacin | 250 | 32 | 2.9 |
|  | 83 | 32 | 2.3 |
|  | 27 | 32 | 2.2 |
|  | 9 | 32 | 2.0 |
|  | 3 | 32 | 1.5 |
| 5-amino-1-phenyl-4-pyrazolecarbonitrile | 250 | 8 | 2.92 |
| 5-amino-1-(p-chlorophenyl)-4-pyrazole-carboxamide | 250 | 8 | 2.48 |
| 5-amino-1-(m-chlorophenyl)-4-pyrazole-carboxamide | 250 | 8 | 1.78 |
| 5-amino-1-(m-fluorophenyl)-4-pyrazole-carboxamide | 250 | 8 | 2.28 |
| 5-amino-3-methyl-1-phenyl-4-pyrazole-carbonitrile | 250 | 8 | 3.32 |
| 5-amino-3-methyl-1-phenyl-4-pyrazole-carboxamide | 250 | 8 | 3.14 |
| 5-amino-1-(m-fluorophenyl)-3-methyl-4-pyrazolecarbonitrile | 250 | 8 | 2.40 |
| 5-amino-1-(m-fluorophenyl)-3-methyl-4-pyrazolecarboxamide | 250 | 8 | 2.44 |
| 5-amino-3-ethyl-1-phenyl-4-pyrazole-carbonitrile | 250 | 8 | 3.38 |
| 5-amino-3-ethyl-1-phenyl-4-pyrazole-carboxamide | 250 | 8 | 5.92 |
| 5-amino-1-(p-chlorophenyl)-3-ethyl-4-pyrazolecarboxamide | 250 | 8 | 2.03 |
| 5-amino-1-(m-chlorophenyl)-3-ethyl-4-pyrazolecarbonitrile | 250 | 8 | 1.76 |
| 5-amino-1-(m-chlorophenyl)-3-ethyl-4-pyrazolecarboxamide | 125 | 8 | 3.63 |
| 5-amino-3-ethyl-1-(p-fluorophenyl)-4-pyrazolecarbonitrile | 250 | 8 | 2.53 |
| 5-amino-3-ethyl-1-(p-fluorophenyl)-4-pyrazolecarboxamide | 250 | 8 | 1.94 |
| 5-amino-3-ethyl-1-(m-fluorophenyl)-4-pyrazolecarbonitrile | 250 | 8 | 2.72 |
|  | 250 | 8 | 8.10 |
| 5-amino-3-ethyl-1-(m-fluorophenyl)-4-pyrazolecarboxamide | 83 | 8 | 3.50 |
|  | 27 | 8 | 1.70 |
|  | 9 | 8 | 1.40 |
| 4-amino-3-ethyl-1-(o-fluorophenyl)-4-pyrazolecarboxamide | 250 | 8 | 3.19 |
| 5-amino-1-(m-bromophenyl)-3-ethyl-4-pyrazolecarboxamide | 250 | 8 | 3.96 |
| 5-amino-3-ethyl-1-(p-tolyl)-4-pyrazole-carboxamide | 250 | 8 | 1.66 |
| 5-amino-3-ethyl-1-(o-tolyl)-4-pyrazole-carboxamide | 250 | 8 | 2.94 |
| 5-amino-3-ethyl-1-(m-nitrophenyl)-4-pyrazolecarbonitrile | 250 | 8 | 1.95 |
| 5-amino-3-ethyl-1-(m-nitrophenyl)-4-pyrazolecarboxamide | 250 | 8 | 2.51 |
| 5-amino-1-(m-fluorophenyl)-3-propyl-4-pyrazolecarbonitrile | 250 | 8 | 1.77 |

[1] Rats fasted overnight prior to testing.
[2] Measurements made 5 hours after oral administration.

Anti-inflammatory activity was demonstrated by suppression of ultraviolet light induced erythema of guinea pigs.

In order to test erythema in albino guinea pigs (Lederle breeding colony) they were depilitated on their flanks, the evening before testing, with a standard mixture of barium sulfide and gum acacia. On the morning of testing, groups of four guinea pigs were dosed by gavage one hour prior to ultraviolet exposure (−1 hour). At 0-hour they were restrained in a plastic container which allows exposure of 3 circular spots. They were then exposed to ultraviolet irradiation from a "Hanovia" Kromayer lamp model 10 for 60 seconds. At +1 and +4 hours the degree of erythema for each of the three sites was assessed according to the following scoring system: 0 = no erythema, 0.5 = incomplete circle or faint erythema and 1.0 = complete circle of distinct erythema. Thus, the maximum score for each animal was 3.0. The following Table II summarizes results obtained with representative compounds of the invention.

TABLE II

The effect of anti-inflammatory agents on development of erythema in guinea pigs (pooled data)

| Treatment | Oral dose, mg./kg. | Score (avg.) 1 hr. | Score (avg.) 4 hrs. | Dead G.P./ total | Decision [1] |
|---|---|---|---|---|---|
| Control | | 2.1 | 2.8 | 4/384 | |
| Aspirin | 250 | 0.1 | 1.2 | 7/88 | A |
|  | 125 | 0.1 | 2.0 | 1/16 | A |
|  | 62.5 | 0.8 | 2.0 | 2/11 | A |
|  | 31.3 | 1.2 | 2.3 | 0/12 | |
| Phenylbutazone | 250 | 0 | 0.5 | 2/60 | A |
|  | 125 | 0.1 | 1.1 | 0/16 | A |
|  | 62.5 | 0.3 | 0.9 | 1/12 | A |
|  | 31.3 | 0.4 | 1.7 | 1/12 | A |
|  | 15.6 | 0.4 | 2.3 | 0/8 | A |
|  | 7.8 | 1.1 | 2.9 | 0/8 | |
| 5-amino-1-phenyl-4-pyrazole-carbonitrile | 250 | 0.0 | 0.6 | 2/4 | A |
|  | 125 | 0.3 | 2.1 | 0/8 | A |
| 5-amino-3-ethyl-1-(m-fluorophenyl)-4-pyrazolecarboxamide | 250 | 0.3 | 2.0 | 0/12 | A |
|  | 125 | 0.6 | 2.0 | 0/8 | A |
|  | 62.5 | 1.6 | 2.3 | 0/8 | |

[1] A=Active (discriminant function analysis).

Tests to show activity against chronic inflammation in adjuvant arthritis were carried out. Groups of three Royal Hart Wistar strain rates, weighting 200 ± 10 g. each, were injected intradermally in the right hind paw with Freund's adjuvant (dried human tubercle bacilli in a mineral oil vehicle) at a dose of 2 mg./kg. of body weight. Test compounds were administered orally in a 1.5 percent starch vehicle at the indicated dosage in mg./kg. of body weight once daily on days 0 through 13 post-challenge. Control rats were treated in a similar manner, but given starch vehicle instead of the test compound. On the 14th and 21st day post-challenge the diameter of the injected paw (primary lesion) is measured by micrometer caliper, the volumes of inflamed paws are estimated from these measurements, and the results are expressed as percent inhibition of swelling as compared to controls at the same time, the other inflamed sites, such as ears, paws and tail (secondary lesions) are observed and the rat graded as to degree of inflammation and swelling present. The grading is based on a scale of 0 to 24.0, where 0 represents a complete absence of induced arthritis nodules and 24.0 represents the maximum degree of inflammation. The mean grade for each treated group is calculated and the effects of each representative compound tested are expressed as percent inhibition of the control grade. The following Table III summarizes the results.

TABLE III
The effect of anti-inflammatory agents on adjuvant arthritis of rats (treatment day 0 to day 13)

| Treatment | Oral dose, mg./kg./day | Dead/treated at 21 days | Mean weight gain (gms.) | | Percent inhibition of swelling (primary lesion) | |
|---|---|---|---|---|---|---|
| | | | Day 14 | Day 21 | Day 14 | Day 21 |
| Normal rats | | 4/51 | a 69 | a 110 | | |
| Adjuvant controls | | 21/234 | 36 | 39 | 0 | 0 |
| Phenylbutazone | 150 | 0/18 | 45 | 50 | a 80 | a 44 |
| | 75 | 2/18 | a 57 | 54 | a 72 | a 23 |
| | 37.5 | 2/18 | 47 | 50 | a 67 | 19 |
| Aspirin | 400 | 4/18 | 48 | 57 | a 76 | a 68 |
| | 200 | 1/18 | 31 | 27 | a 51 | a 36 |
| | 100 | 7/18 | 42 | 49 | a 40 | a 21 |
| 5-amino-3-ethyl-1-phenyl-4-pyrazolecarboxamide | 50 | 2/14 | 25 | 25 | a 42 | 13 |
| 5-amino-1-(m-chlorophenyl)-3-ethyl-4-pyrazolecarboxamide | 50 | 5/21 | 0 | 14 | a 42 | 24 |
| 5-amino-3-ethyl-1-(m-fluorophenyl)-4-pyrazolecarboxamide | 50 | 4/18 | a −5 | 26 | a 55 | a 41 |
| | 25 | 1/9 | a 13 | 21 | a 49 | 0 |
| | 12.5 | 0/9 | 30 | 31 | 19 | 0 | a Significantly different from adjuvant controls (p=<0.05 by t test).

The effect of present compounds on body temperature in yeast induced pyrexia was determined by the following procedure. Groups of three Wistar strain rats (Royal Hart) weighing 80 ± 5 g. were injected subcutaneously in the nape of the neck with 0.5 ml. of a 40% suspension of dried brewer's yeast in distilled water. Test compounds were suspended in a 1.5 percent buffered starch solution and administered at various doses by gavage 17 hours post challenge. Control rats were treated in a similar manner but were given only the buffered starch solution. At 19 hours post challenge the rectal temperature of each rat was measured with an electric thermometer. Each dose response experiment was replicated one or more times. The following Table IV summaries the results obtained with a representative compound of the invention when compared to other commercial anti-inflammatory agents.

TABLE IV

The effect of anti-inflammatory agents on the body temperature of pyretic rats

| Treatment | Oral Dose mg./kg. | Rats with yeast induced pyresis No. rats | Body Temp. °C. |
|---|---|---|---|
| Control | — | 156 | 38.3 |
| Aspirin | 250 | 15 | 36.8+ |
| | 83 | 15 | 37.1+ |
| | 27 | 15 | 37.2+ |
| | 9 | 15 | 37.5+ |
| | 3 | 6 | 38.1 |
| Phenylbutazone | 250 | 15 | 36.8+ |
| | 83 | 15 | 37.0+ |
| | 27 | 15 | 37.2+ |
| | 9 | 15 | 37.3+ |
| | 3 | 15 | 37.7+ |
| Indomethacin | 250 | 21 | 35.8+ |
| | 27 | 15 | 36.9+ |
| | 9 | 15 | 36.9+ |
| | 3 | 15 | 37.3+ |
| | 1 | 15 | 37.7+ |
| | 0.3 | 15 | 38.1+ |
| 5-Amino-3-ethyl-1-(m-fluorophenyl)-4-pyrazolecarboxamide | 250 | 6 | 33.6+ |
| | 83 | 6 | 36.2+ |
| | 27 | 6 | 36.5+ |

+ Significantly lower temperature than pyretic controls. p=<0.05 by t test.

SPECIFIC DISCLOSURE

The following examples describe in detail the synthesis of active components of the present invention and formulations of various types of pharmaceutical preparations.

EXAMPLE 1

Preparation of 5-Amino-1-phenyl-4-pyrazolecarbonitrile

The subject compound is prepared as described by C. C. Cheng and R. K. Robins, *J. Org. Chem.*, 21, 1240 (1956).

EXAMPLE 2

Preparation of 5-Amino-1-(m-fluorophenyl)-4-pyrazolecarbonitrile

A mixture of 12.2 g. of ethoxymethylenemalononitrile, 16.3 g. of m-fluorophenylhydrazine hydrochloride and 8.2 g. of sodium acetate in 100 ml. of absolute ethanol is heated under reflux for 18 hours. The solvent is removed by evaporation under reduced pressure and the resulting solid is triturated with water and removed by filtration to give 18.2 g. of product, melting point 155°–156°C. Recrystallization of a 10.7 g. sample from acetone-hexane gives 2.8 g. of 5-amino-1-(m-fluorophenyl)-4-pyrazolecarbonitrile as colorless crystals, melting point 160°–161°C.

EXAMPLE 3

Preparation of 5-Amino-1-( m-fluorophenyl)-4-pyrazolecarboxamide

To 25 ml. of stirred concentrated sulfuric acid is added, portionwise, 5.6 g. of pulverized 5-amino-1-(m-fluorophenyl)-4-pyrazolecarbonitrile. The reaction is carried out as in Example 17. In this manner 5.9 g. of colorless crystals, melting point 205°–206°C., is obtained. Recrystallization from acetone-hexane gives 2.4 g. of 5-amino-1-(m-fluorophenyl)-4-pyrazolecarboxamide as colorless crystals, melting point 205°–206°C.

EXAMPLE 4

Preparation of 5-Amino-1-(p-fluorophenyl)-4-pyrazolecarbonitrile

A mixture of 1.62 g. of p-fluorophenylhydrazine hydrochloride, 1.22 g. of ethoxymethylenemalononitrile and 0.900 g. of anhydrous sodium acetate in 15 ml. of absolute ethanol is heated under reflux for 3 hours and then evaporated partially under reduced pressure until an orange crystalline mass forms. The mixture is diluted with water, chilled, and the orange crystals are removed by filtration, washed with water and air-dried to yield 1.70 g. A second crop of 0.144 g. of orange crystals is obtained by further chilling of the mother liquor and filtering. The combined crops are dissolved by warming in 200 ml. of benzene and chromatographed on a 100 g. column of silica gel (60–200 mesh). The column is eluted with 400 ml. of benzene and 525 ml. of benzene-ether (9:1) and these eluants are discarded. The next 1.35 liters of benzene-ether (9:1) eluant is evaporated under reduced pressure to give 1.66 g. of tan crystals. This is slurried with dichloromethane-hexane and filtered to yield 1.66 g. of 5-amino-1-(p-fluorophenyl)-4-pyrazolecarbonitrile as light tan crystals, melting point 179°–181°C.

EXAMPLE 5

Preparation of 5-Amino-1-(p-fluorophenyl)-4-pyrazolecarboxamide

A mixture of 7.50 g. of 5-amino-1-(p-fluorophenyl)-4-pyrazolecarbonitrile, 150 ml. of 2N sodium hydroxide and 150 ml. of absolute ethanol is heated under reflux for 2 hours and then evaporated under reduced pressure to 150 ml. After chilling, the resulting cream-colored crystals are removed by filtration, washed with water and air-dried to yield 6.67 g. of product. Two recrystallizations from aqueous ethanol give 4.80 g. of 5-amino-1-(p-fluorophenyl)-4-pyrazolecarboxamide as cream colored crystals, melting point 242°–243.5°C.

EXAMPLE 6

Preparation of 5-Amino-1-(m-chlorophenyl)-4-pyrazolecarbonitrile

A mixture of 12.7 g. of ethoxymethylenemalononitrile and 14.7 g. of m-chlorophenylhydrazine in 200 ml. of absolute ethanol is heated under reflux for 18 hours. The solvent is removed by evaporation under reduced pressure and the resulting solid is triturated with hexane and removed by filtration to give 18.2 g. of product, melting point 185°–187°C. Recrystallization of a 12.2 g. sample from acetone-hexane gives 9.3 g. of 5-amino-1-(m-chlorophenyl)-4-pyrazolecarbonitrile as colorless crystals, melting point 185°–187°C.

EXAMPLE 7

Preparation of 5-Amino-1-(m-chlorophenyl)-4-pyrazolecarboxamide

To 30 ml. of stirred concentrated sulfuric acid is added, portionwise, 6.0 g. of pulverized 5-amino-1-(m-chlorophenyl)-4-pyrazolecarbonitrile. Stirring is continued for one hour after complete solution. The resulting solution is adjusted to pH 9–10 with concentrated ammonium hydroxide. The resulting solid is collected by filtration and dried to give 7.5 g. of crystalline product, melting point 189°–191°C. Recrystallization from acetonehexane gives 4.4 g. of 5-amino-1-(m-chlorophenyl)-4-pyrazolecarboxamide as colorless crystals, melting point 189°–191°C.

EXAMPLE 8

Preparation of 5-Amino-1-(p-chlorophenyl)-4-pyrazolecarbonitrile

A mixture of 14.8 g. of p-chlorophenylhydrazine hydrochloride, 10.1 g. of ethoxymethylenemalononitrile and 6.69 g. of anhydrous sodium acetate in 175 ml. of absolute ethanol is heated under reflux for 5.5 hours and filtered while hot. After chilling and filtering, 5.59 g. of light brown crystals of 5-amino-1-(p-chlorophenyl)-4-pyrazolecarbonitrile, melting point 173°–175.5°C., are obtained.

EXAMPLE 9

Preparation of 5-Amino-1-(p-chlorophenyl)-4-pyrazolecarboxamide

A mixture of 6.86 g. of 5-amino-1-(p-chlorophenyl)-4-pyrazolecarbonitrile, 140 ml. of 2N sodium hydroxide and 140 ml. of absolute ethanol is heated under reflux for 2 hours and worked up as in Example 5. The resulting 6.32 g. of brown crystals, melting point 202-205°C., is recrystallized from aqueous ethanol using activated charcoal to give 4.92 g. of 5-amino-1-(p-chlorophenyl)-4-pyrazolecarboxamide as colorless crystals, melting point 202.5°–205.5°C.

EXAMPLE 10

Preparation of 5-Amino-3-methyl-1-phenyl-4-pyrazolecarbonitrile

A mixture of 10.0 g. of (1-ethoxyethylidene)malononitrile, 10.6 g. of phenylhydrazine hydrochloride and 6.0 g. of sodium acetate in 150 ml. of absolute ethanol is refluxed for 18 hours. After evaporation of the solution to dryness under reduced pressure, the residue is dissolved in methylene chloride, dried, and filtered through magnesium silicate. The filtrate is evaporated under reduced pressure to give a solid which is crystallized from acetone-hexane to give 9.3 g. of product, melting point 128°–130°C. Recrystallization of a 4.0 g. sample from acetone-hexane gives 2.8 g. of 5-amino-3-methyl-1-phenyl-4-pyrazolecarbonitrile as colorless crystals, melting point 128°–130°C.

EXAMPLE 11

Preparation of 5-Amino-3-methyl-1-phenyl-4-pyrazolecarboxamide

To 25 ml. of stirred concentrated sulfuric acid is added, portionwise, 5.2 g. of pulverized 5-amino-3-methyl-1-phenyl-4-pyrazolecarbonitrile. The reaction is carried out as in Example 17 to yield 5.2 g. of product, melting point 163-165°C. Recrystallization from acetone-hexane give 4.7 g. of 5-amino-3-methyl-1-phenyl-4-pyrazolecarboxamide as colorless crystals, melting point 163°–165°C.

EXAMPLE 12

Preparation of 5-Amino-1-(m-fluorophenyl)-3-methyl-4-pyrazolecarbonitrile

A mixture of 24.4 g. of m-fluorophenylhydrazine hydrochloride, 20.4 g. of (1-ethoxyethylidene)malononitrile and 12.3 g. of anhydrous sodium acetate in 300 ml. of absolute ethanol is heated under refluxing temperature for 18 hours, cooled and filtered. The dark brown filtrate is evaporated under reduced pressure to a brown crystalline residue. Addition of aqueous ethanol and filtration gives, in three crops, 26.6 g. of brown crystals. Recrystallization from 400 ml. of benzene using activated charcoal gives 18.1 g. of light tan crystals, melting point 150°–154°C. A 5.00 g. portion is recrystallized twice from benzene using activated charcoal to give 3.36 g. of 5-amino-1-(m-fluorophenyl)-3-methyl-4-pyrazolecarbonitrile as colorless crystals, melting point 150°–152°C.

EXAMPLE 13

Preparation of 5-Amino-1-(m-fluorophenyl)-3-methyl-4-pyrazolecarboxamide 124.5°

A mixture of 6.50 g. of 5-amino-1-(m-fluorophenyl)-3-methyl-4-pyrazolecarbonitrile, 140 ml. of 2N sodium hydroxide and 140 ml. of absolute ethanol is heated under reflux for 2 hours and then evaporated under reduced pressure to one-half volume. The mixture is chilled and filtered to give 6.49 g. of tan crystals, melting point 145°–153°C. Two recrystallizations from absolute ethanol give 2.72 g. of 5-amino-1-(m-fluorophenyl)-3-methyl-4-pyrazolecarboxamide as nearly colorless crystals, melting point 162°–164°C.

EXAMPLE 14

Preparation of 5-Amino-1-(p-fluorophenyl)-3-methyl-4-pyrazolecarbonitrile

A mixture of 24.4 g. of p-fluorophenylhydrazine hydrochloride, 20.4 g. of (1-ethoxyethylidene)malonitrile and 12.3 g. of anhydrous sodium acetate in 300 ml. absolute ethanol is heated under reflux for 17 hours, cooled and filtered. The filtrate is evaporated under reduced pressure to give a red crystalline residue. Aqueous ethanol is added and the mixture is chilled and filtered to yield 27.8 g. of light brown crystals, melting point 153°–158°C. A 7.85 g. portion is recrystallized twice from aqueous ethanol using activated charcoal to give 5.53 g. of 5-amino-1-(p-fluorophenyl)-3-methyl-4-pyrazolecarbonitrile as colorless crystals, melting point 158°–160°C.

EXAMPLE 15

Preparation of 5-Amino-1-(p-fluorophenyl)-3-methyl-4-pyrazolecarboxamide

A mixture of 7.50 g. of 5-amino-1-(p-fluorophenyl)-3-methyl-4-pyrazolecarbonitrile, 150 ml. of 2N sodium hydroxide and 150 ml. of absolute ethanol is heated under reflux for 2 hours. After being allowed to stand at room temperature the resulting colorless needles are removed by filtration, washed with water and air-dried to give 5.95 g. of product, melting point 235°–238°C. Recrystallization from 90 percent ethanol affords 4.77 g. of 5-amino-1-(p-fluorophenyl)-3-methyl-4-pyrazolecarboxamide as colorless crystals, melting point 237°–239°C.

EXAMPLE 16

Preparation of 5-Amino-3-ethyl-1-phenyl-4-pyrazolecarbonitrile

A mixture of 22.5 g. of (1-ethoxypropylidene)-malononitrile, 21.7 g. of phenylhydrazine hydrochloride and 12.3 g. of sodium acetate in 300 ml. of absolute ethanol is heated under reflux for 24 hours. The solvent is removed under reduced pressure to give an oil which crystallized on trituration with hexane. The crystals are removed by filtration, dissolved in methylene chloride, washed with water, dried over anhydrous magnesium sulfate and filtered through magnesium silicate to remove most of the color. Evaporation of the solvent under reduced pressure gives 20.3 g. of pink solid, melting point 130°–132°C. Recrystallization of a 5.0 g. sample from acetone-hexane gives 4.0 g. of 5-amino-3-ethyl-1-phenyl-4-pyrazolecarbonitrile as colorless crystals, melting point 132°–133°C.

EXAMPLE 17

Preparation of 5-Amino-3-ethyl-1-phenyl-4-pyrazolecarboxamide

To 3.5 ml. of stirred concentrated sulfuric acid is added, portionwise, 1.0 g. of pulverized 5-amino-3-ethyl-1-phenyl-4-pyrazolecarbonitrile. The reaction mixture is stirred 1 hour longer and then poured onto ice-water. A small amount of starting material separates and is removed by filtration. The filtrate is made basic with concentrated ammonium hydroxide and the resulting colorless crystals are removed by filtration, washed with water and dried to give 0.77 g. of product, melting point 152°–154°C. Recrystallization from acetone-hexane gives 0.60 g. of 5-amino-3-ethyl-1-phenyl-4-pyrazolecarboxamide as colorless crystals, melting point 155°–156°C.

EXAMPLE 18

Preparation of 5-Amino-3-ethyl-1-(o-fluorophenyl)-4-pyrazolecarbonitrile

A mixture of 22.5 g. of (1-ethoxypropylidene)-malononitrile, 24.4 g. of o-fluorophenylhydrazine hydrochloride, and 12.3 g. of sodium acetate in 300 ml. of absolute ethanol is heated under refluxing temperature for 24 hours. The solvent is removed by evaporation under reduced pressure. Methylene chloride is added to the residue and this is filtered through magnesium silicate. The filtrate is evaporated under reduced pressure to give a dark solid which is triturated several times with boiling hexane. The residual solid is recrystallized from acetone-hexane to give 21.8 g. of crystalline product, melting point 145°–147°C. Recrystallization of 10.0 g. from acetone-hexane gives 8.4 g. of 5-amino-1-(o-fluorophenyl)-3-ethyl-4-pyrazolecarbonitrile as colorless crystals, melting point 146°–148°C.

EXAMPLE 19

Preparation of 5-Amino-3-ethyl-1-(o-fluorophenyl)-4-pyrazolecarboxamide

To 50 ml. of stirred concentrated sulfuric acid is added, portionwise, 11.8 g. of pulverized 5-amino-3-ethyl-1-(o-fluorophenyl)-4-pyrazolecarbonitrile. The resulting solution is stirred for 1½ hours after complete solution and is then adjusted to pH 9-10 with concentrated ammonium hydroxide. The solid which separates is collected by filtration and dried to give 12.6 g. of product, melting point 191°–192°C. Recrystallization from acetone-hexane using activated charcoal affords 8.5 g. of 5-amino-3-ethyl-1-(o-fluorophenyl)-4-pyrazolecarboxamide as colorless crystals, melting point 192°–193°C.

EXAMPLE 20

Preparation of 5-Amino-3-ethyl-1-(m-fluorophenyl)-4-pyrazolecarbonitrile

A mixture of 24.4 g. of m-fluorophenylhydrazine hydrochloride, 22.5 g. of (1-ethoxypropylidene)-malononitrile and 12.3 g. of anhydrous sodium acetate in 300 ml. of absolute ethanol is refluxed for 23 hours and worked up as in Example 18. The yield of light tan crystals from benzene is 22.2 g., melting point 128°–131°C. Recrystallization of a 5.00 g. sample from 50 ml. of benzene using activated charcoal gives 3.24 g. of 5-amino-3-ethyl-1-(m-fluorophenyl)-4- pyrazolecarbonitrile as colorless crystals, melting point 130°–132°C.

EXAMPLE 21

Preparation of 5-Amino-3-ethyl-1-(m-fluorophenyl)-4-pyrazolecarboxamide

A mixture of 6.50 g. of 5-amino-3-ethyl-1-(m-fluorophenyl)-4-pyrazolecarbonitrile, 140 ml. of 2N sodium hydroxide and 140 ml. of absolute ethanol is heated under reflux for 6.5 hours and then evaporated under reduced pressure until an oil separates. A few drops of ethanol are added and crystallization occurs. After chilling, the nearly colorless crystals are removed by filtration, washed with water and air-dried to give 5.25 g. of product, melting point 114°–116°C. The crystals are dissolved in dichloromethane and chromatographed over silica gel. The column is eluted with ether (200 ml. cuts) and cuts 3–9 are combined and the solvent is removed by evaporation under reduced pressure. The residual crystalline solid (4.37 g.) is recrystallized from acetone-hexane to give 2.79 g. of 5-amino-3-ethyl-1-(m-fluorophenyl)-4-pyrazolecarboxamide as colorless crystals, melting point 124,5°–126°C.

EXAMPLE 22

Preparation of 5-Amino-3-ethyl-1-(p-fluorophenyl)-4-pyrazolecarbonitrile

A mixture of 24.4 g. of p-fluorophenylhydrazine hydrochloride, 22.5 g. of (1-ethoxypropylidene)-malononitrile and 12.3 g. of anhydrous sodium acetate in 300 ml. of absolute ethanol is heated under reflux for 6 hours, cooled and filtered. The filtrate is evaporated under reduced pressure to a red oil which crystallizes when water is added. The red crystals are removed by filtration, washed with water and air-dried to yield 31.9 g. of product. Recrystallization from 400 ml. of 50 percent ethanol using activated charcoal gives 23.7 g. of light pink plates, melting point 145°–149°C. A 5.00 g. portion is recrystallized twice from absolute ethanol to give 3.56 g. of 5-amino-3-ethyl-1-(p-fluorophenyl)-4-pyrazolecarbonitrile as colorless plates, melting point 147°–149°C.

EXAMPLE 23

Preparation of 5-Amino-3-ethyl-1-(p-fluorophenyl)-4-pyrazolecarboxamide

A mixture of 10.0 g. of 5-amino-3-ethyl-1-(p-fluorophenyl)-4-pyrazolecarbonitrile, 200 ml. of 2N sodium hydroxide and 200 ml. of absolute ethanol is heated under refluxing temperature for 6.5 hours and worked up as in Example 5. The yield of colorless product, melting point 212°–215°C., is 8.68 g. Recrystallization from absolute ethanol gives 7.80 g. of 5-amino-3-ethyl-1-(p-fluorophenyl)-4-pyrazolecarboxamide as colorless crystals, melting point 215°–217°C.

EXAMPLE 24

Preparation of 5-Amino-1-(m-chlorophenyl)-3-ethyl-4-pyrazolecarbonitrile

A mixture of 22.5 g. of (1-ethoxypropylidene)-malononitrile, 36.1 g. of m-chlorophenylhydrazine sulfate and 24.6 g. of sodium acetate in 300 ml. of absolute ethanol is heated under reflux for 24 hours. The mixture is evaporated under reduced pressure and the residue is dissolved in a mixture of water and benzene. The benzene layer is separated, washed with water, dried over magnesium sulfate and evaporated under reduced pressure to give 13.5 g. of a dark gum which solidifies. Two recrystallizations from acetone-hexane give 9.5 g. of 5-amino-1-(m-chloro-phenyl)-3-ethyl-4-pyrazolecarbonitrile as colorless crystals, melting point 113°–115°C.

EXAMPLE 25

Preparation of 5-Amino-1-(m-chlorophenyl)-3-ethyl-4-pyrazolecarboxamide

To 25 ml. of stirred concentrated sulfuric acid is added, portionwise, 5.0 g. of pulverized 5-amino-1-(m-chlorophenyl)-3-ethyl-4-pyrazolecarbonitrile. The temperature is maintained at 25° to 40°C. and, after stirring for one hour, the reaction is worked up as in Example 17. In this way 3.8 g. of product, melting point 135°–137°C., is obtained. Recrystallization from acetone-hexane gives 5-amino-1-(m-chlorophenyl)-3-ethyl-4-pyrazolecarboxamide as colorless needles, melting point 137°–139°C.

EXAMPLE 26

Preparation of 5-Amino-1-(p-chlorophenyl)-3-ethyl-4-pyrazolecarbonitrile

A mixture of 10.0 g. of (1-ethoxypropylidene)-malononitrile, 12.0 g. of p-chlorophenylhydrazine hydrochloride and 6.0 g. of sodium acetate in 100 ml. of absolute ethanol is heated under refluxing temperature for 18 hours. The solvent is removed by evaporation under reduced pressure and the resulting solid is triturated with ether and removed by filtration to give 11.4 g. of pink crystals, melting point 193°–194°C. Recrystallization of a 5.0 g. sample from acetone-hexane gives 2.8 g. of 5-amino-1-(p-chlorophenyl)-3-ethyl-4-pyrazolecarbonitrile as colorless crystals, melting point 194°–195°C.

EXAMPLE 27

Preparation of 5-Amino-1-(p-chlorophenyl)-3-ethyl-4-pyrazolecarboxamide

To 30 ml. of stirred concentrated sulfuric acid is added, portionwise, 6.2 g. of 5-amino-1-(p-chlorophenyl)-3-ethyl-4-pyrazolecarbonitrile. The reaction mixture is stirred for 1½ hours after complete solution. The resulting solution is adjusted to pH 9–10 with concentrated ammonium hydroxide. The solid which separates is collected by filtration, washed with water and dried to give 5.1 g. of product, melting point 170°–172°C. Recrystallization from acetone-hexane gives 3.8 g. of 5-amino-1-(p-chlorophenyl)-3-ethyl-4-pyrazolecarboxamide as colorless crystals, melting point 173°–174°C.

EXAMPLE 28

Preparation of 5-Amino-1-(m-bromophenyl)-3-ethyl-4-pyrazolecarbonitrile

A mixture of 15.0 g. of (1-ethoxypropylidene)-malononitrile, 22.3 g. of m-bromophenylhydrazine hydrochloride and 8.2 g. of sodium acetate in 200 ml. of absolute ethanol is heated under reflux for 24 hours. The solvent is removed by evaporation under reduced pressure and the residue is crystallized from acetone-hexane to give 17.7 g. of tan product, melting point 123°–125°C. Recrystallization of 7.0 g. from acetone-hexane gives 5.4 g. of 5-amino-1-(m-bromophenyl)-3-ethyl-4-pyrazolecarbonitrile as colorless crystals, melting point 125°–126°C.

EXAMPLE 29

Preparation of 5-Amino-1-(m-bromophenyl)-3-ethyl-4-pyrazolecarboxamide

To 60 ml. of stirred concentrated sulfuric acid is added, portionwise, 10.7 g. of 5-amino-1-(m-bromophenyl)-3-ethyl-4-pyrazolecarbonitrile. Stirring is continued for 1 hour after solution and the reaction solution is adjusted to pH 9-10 with concentrated ammonium hydroxide. The resulting solid is collected by filtration, dissolved in methylene chloride and filtered through magnesium silicate. The filtrate is evaporated under reduced pressure to give 7.7 g. of a white crystalline product, melting point 140°–141°C. Recrystallization from acetonehexane gives 5-amino-1-(m-bromophenyl)-3-ethyl-4-pyrazolecarboxamide as colorless crystals, melting point 141°–142°C.

EXAMPLE 30

Preparation of 5-Amino-3-ethyl-1-(o-tolyl)-4-pyrazolecarbonitrile

A mixture of 10.2 g. of o-tolylhydrazine hydrochloride, 9.7 g. of (1-ethoxypropylidene)malononitrile and 5.3 g. of sodium acetate in 100 ml. of absolute ethanol is heated under refluxing temperature for 18 hours, and evaporated under reduced pressure to a residual gum. The gum is triturated several times with hexane, dissolved in methylene chloride and the solution is passed through magnesium silicate. The filtrate is evaporated under reduced pressure to give 10.0 g. of residual solid which is recrystallized from acetone-hexane to give 7.2 g. of product, melting point 115°–117°C. Two recrystallizations of a 3.0 g. sample from acetone-hexane give 1.9 g. of 5-amino-3-ethyl-1-(o-tolyl)-4-pyrazolecarbonitrile as colorless crystals, melting point 119°–120°C.

EXAMPLE 31

Preparation of 5-Amino-3-ethyl-1-(o-tolyl)-4-pyrazolecarboxamide

To 20 ml. of stirred concentrated sulfuric acid is added, portionwise, 4.2 g. of pulverized 5-amino-3-ethyl-1-(o-tolyl)-4-pyrazolecarbonitrile and the reaction is carried out as in Example 33. Evaporation of the methylene chloride solution affords 3.8 g. of crystalline product, melting point 139°–140°C. Recrystallization from acetone-hexane gives 3.3 g. of 5-amino-3-ethyl-1-(o-tolyl)-4-pyrazolecarboxamide as colorless crystals, melting point 140°–141°C.

EXAMPLE 32

Preparation of 5-Amino-3-ethyl-1-(m-tolyl)-4-pyrazolecarbonitrile

A mixture of 10.0 g. of m-tolylhydrazine hydrochloride, 9.5 g. of (1-ethoxypropylidene)malononitrile and 5.2 g. of sodium acetate in 100 ml. of absolute ethanol is heated under reflux for 18 hours. The mixture is evaporated to dryness under reduced pressure and the residual oil crystallizes on trituration with hexane. The crystals are removed by filtration and dissolved in methylene chloride, and the resulting solution is washed with water, dried over magnesium sulfate and filtered through magnesium silicate to remove some color. Evaporation of the filtrate gives 11.7 g. of a light pink solid, melting point 114°–115°C. Recrystallization of 4 g. from acetone-hexane gives 3.6 g. of 5-amino-3-ethyl-1-(m-tolyl)-4-pyrazolecarbonitrile as colorless crystals, melting point 114°–115°C.

EXAMPLE 33

Preparation of 5-Amino-3-ethyl-1-(m-tolyl)-4-pyrazolecarboxamide

To 30 ml. of stirred concentrated sulfuric acid is added, portionwise, 7.5 g. of pulverized 5-amino-3-ethyl-1-(m-tolyl)-4-pyrazolecarbonitrile while maintaining the temperature at 25°–40°C. The resulting solution is adjusted to pH 9–10 with concentrated ammonium hydroxide. The resulting solution is stirred for 1 hour and then poured into ice-water. The solution is adjusted to pH 9–10 with concentrated ammonium hydroxide. The resulting solid is collected by filtration, dissolved in methylene chloride and filtered through magnesium silicate. The filtrate is evaporated under reduced pressure to give 7.6 g. of crude crystalline product, melting point 120°–122°C. Recrystallization from acetone-hexane gives 5.3 g. of 5-amino-3-ethyl-1-(m-tolyl)-4-pyrazolecarboxamide as colorless crystals, melting point 132°–134°C.

EXAMPLE 34

Preparation of 5-Amino-3-ethyl-1-(p-tolyl)-4-pyrazolecarbonitrile

A mixture of 10.0 g. of p-tolylhydrazine hydrochloride, 9.5 g. of (1-ethoxypropylidene)malononitrile, and 5.2 g. of sodium acetate in 100 ml. of absolute ethanol is heated under reflux for 18 hours. Evaporation under reduced pressure gives a residual gum and solid. The residue is triturated with hot hexane and then dissolved in methylene chloride and the solution is washed with water, dried over magnesium sulfate and passed through magnesium silicate. The filtrate is evaporated under reduced pressure to give 15.4 g. of dark solid. Recrystallization from acetone-hexane gives 6.7 g. of product, melting point 163°–164°C. One additional recrystallization of a 2.5 g. sample from acetone-hexane gives 2.1 g. of 5-amino-3-ethyl-1-(p-tolyl)-4-pyrazolecarbonitrile as a colorless solid, melting point 163°–164°C.

EXAMPLE 35

Preparation of 5-Amino-3-ethyl-1-(p-tolyl)4-pyrazolecarboxamide

To 20 ml. of stirred concentrated sulfuric acid is added, portionwise, 4.0 g. of pulverized 5-amino-3-ethyl-1-(p-tolyl)-4-pyrazolecarbonitrile and the reaction is carried out as in Example 17. In this way 4.2 g. of colorless crude product, melting point 190°–193°C., is obtained. Recrystallization from acetone-hexane gives 2.1 g. of 5-amino-3-ethyl-1-(p-tolyl)-4-pyrazolecarboxamide as colorless crystals, melting point 196°–197°C.

EXAMPLE 36

Preparation of 5-Amino-3-ethyl-1-(m-nitrophenyl)-4-pyrazolecarbonitrile

A mixture of 15.0 g. of (1-ethoxypropylidene)-malononitrile, 19.0 g. of m-nitrophenylhydrazine hydrochloride and 8.2 g. of sodium acetate in 200 ml. of absolute ethanol is refluxed for 6 hours. After removal of the solvent under reduced pressure, the residue is triturated with ether, removed by filtration and dried to give 20.0 g. of product, melting point 175°–176°C. Several recrystallizations from acetone-hexane gives 10.9 g. of 5-amino-3-ethyl-1-(m-nitrophenyl)-4-pyrazolecarbonitrile as yellow crystals, melting point 175°–177°C.

EXAMPLE 37

Preparation of 5-Amino-3-ethyl-1-(m-nitrophenyl)-4-pyrazolecarboxamide

To 30 ml. of stirred concentrated sulfuric acid is added, portionwise, 5.5 g. of pulverized 5-amino-3-ethyl-1-(m-nitrophenyl)-4-pyrazolecarbonitrile. The reaction is carried out as in Example 17. Two recrystallizations of the resulting crystals from acetone-hexane give 2.5 g. of 5-amino-3-ethyl-1-(m-nitrophenyl)-4-pyrazolecarboxamide as colorless crystals, melting point 159°–160°C.

EXAMPLE 38

Preparation of 5-Amino-1-phenyl-3-propyl-4-pyrazolecarbonitrile

A mixture of 500 g. of butyronitrile, 262 g. of anhydrous methanol and 3.0 l. of anhydrous ether is chilled by means of an ice bath and treated with hydrogen chloride until 325 g. is absorbed. The mixture is allowed to stand at 0°–5°C. for 48 hours. The resulting colorless precipitate is removed by filtration and the filtrate is concentrated under reduced pressure to 500 ml. and poured into 2.0 l. of ether. A second crop of colorless precipitate is obtained. The combined crops are triturated in 1.0 l. of ether, filtered and air-dried to give 464 g. of methyl butyrimidate hydrochloride as a colorless solid, melting point 67°–69°C. with decomposition.

A mixture of 464 g. of methyl butyrimidate hydrochloride and 1.24 liters of anhydrous methanol is stirred at room temperature for 63 hours and diluted with 4.34 liters of anhydrous ether. The resulting mixture is stirred and heated under gentle refluxing conditions for an additional 16 hours. After chilling, the colorless precipitate is removed by filtration and the filtrate is evaporated under reduced pressure to a residual oil. The oil is distilled through a Widmer column to give 166 g. of methyl orthobutyrate as a colorless liquid, boiling point 144°–146°C.

A mixture of 80.0 g. of methyl orthobutyrate and 35.6 g. of malononitrile is heated under refluxing conditions for 13 hours and evaporated under reduced pressure to a brown colored oil. The oil is distilled under reduced pressure and the fraction (57.8 g.) boiling at 128°–133°C. is collected. Redistillation affords 53.2 g. of (1-methoxybutylidene)malononitrile as a colorless liquid, boiling point 126°–128°C. at 3.5 mm. Hg.

A mixture of 5.4 g. of phenylhydrazine and 8.2 g. of (1-methoxybutylidene)malononitrile in 100 ml. of absolute ethanol is heated under refluxing conditions for 18 hours. Evaporation under reduced pressure gives a residual oil which crystallizes when triturated with hexane. The solid is collected by filtration, washed with hexane and dried to give 10.8 g. of crude product, melting point 80°–85°C. Recrystallization of a 4.0 g. sample from acetone-hexane gives 3.3 g. of 5-amino-1-phenyl-3-propyl-4-pyrazolecarbonitrile as colorless plates, melting point 89°–91°C.

EXAMPLE 39

Preparation of 5-Amino-1-phenyl-3-propyl-4-pyrazolecarboxamide

To 30 ml. of stirred concentrated sulfuric acid is added, portionwise, 6.8 g. of pulverized 5-amino-1-phenyl-3-propyl-4-pyrazolecarbonitrile. The resulting solution is stirred for one hour and then poured into ice water. The solution is adjusted to pH 9-10 with concentrated ammonium hydroxide. The resulting solid is collected by filtration, dissolved in methylene chloride and the solution is filtered through magnesium silicate. The filtrate is evaporated under reduced pressure to give 6.4 g. of product as light tan crystals, melting point 114°–115°C. Recrystallization from acetone-hexane gives 5-amino-1-phenyl-3-propyl-4-pyrazolecarboxamide as colorless needles, melting point 114°–115°C.

EXAMPLE 40

Preparation of 5-Amino-1-(m-fluorophenyl)-3-propyl-4-pyrazolecarbonitrile

A mixture of 24.4 g. of m-fluorophenylhydrazine hydrochloride 22.5 g. of (1-methoxybutylidene)malononitrile and 12.3 g. of anhydrous sodium acetate in 300 ml. of absolute ethanol is heated under reflux for 31 hours, cooled and filtered. The filtrate is evaporated under reduced pressure to give a residual reddish-brown oil. This is slurried with hexane and the resulting orange crystals are removed by filtration, washed with hexane and air-dried to give 33.6 g. of product, melting point 78°–83°C. Recrystallization from ether-hexane using activated charcoal gives 20.9 g. of light tan crystals, melting point 84°–87°C. Recrystallization of a 7.30 g. portion from aqueous ethanol using activated charcoal gives 5.36 g. of 5-amino-1-(m-fluorophenyl)-3-propyl-4-pyrazolecarbonitrile as colorless plates, melting point 85°–86.5°C.

EXAMPLE 41

Preparation of 5-Amino-1-(m-fluorophenyl)-3-propyl-4-pyrazolecarboxamide

A mixture of 13.6 g. of 5-amino-1-(m-fluorophenyl)-3-propyl-4-pyrazolecarbonitrile, 300 ml. of 4N sodium hydroxide and 300 ml. of absolute ethanol is heated under refluxing conditions for 5 hours and worked up as in Example 21. The yield of colorless crystalline product, melting point 131°–134°C., is 8.44 g. Recrystallization from 250 ml. of 40 percent ethanol using activated charcoal gives 5.92 g. of 5-amino-1-(m-fluorophenyl)-3-propyl-4-pyrazolecarboxamide as colorless crystals, melting point 135°–137°C.

EXAMPLE 42

Preparation of 50 mg. Tablets

| Per Tablet | | For 10,000 Tablets |
|---|---|---|
| 0.050 g. | 5-Amino-3-ethyl-1-(m-fluorophenyl)-4-pyrazolecarboxamide | 500 g. |
| 0.080 | Lactose | 800 |
| 0.010 | Corn Starch (For Mix) | 100 |
| 0.008 | Corn Starch (For Paste) | 75 |
| 0.148 g.(total) | | (total) 1475 g. |
| 0.002 g. | Magnesium Stearate | 15 g. |
| 0.150 g. (total) | | (total) 1490 g. |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed through a No. 8 hand screen and dried at 120°F. The dry granules are then passed through a No. 16 screen. The mixture is lubricated with 1 percent magnesium stearate and compressed into tablets in a suitable tableting machine.

EXAMPLE 43

Preparation of Oral Syrup

| Ingredient | Amount |
| --- | --- |
| Active ingredient: | |
| 5-Amino-1-(m-chlorophenyl)-3-ethyl-4-pyrazolecarboxamide | 500 mg. |
| Sorbitol solution (70% N.F.) | 40 ml. |
| Sodium benzoate | 150 mg. |
| Saccharin | 10 mg. |
| Red Dye (F.D. & C. No. 2) | 10 mg. |
| Cherry flavor | 50 mg. |
| Distilled water, q.s. ad | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

EXAMPLE 44

Preparation of Parenteral Solution

In a solution of 700 ml. of propylene glycol and 200 ml. of water for injection is dissolved 20.0 g. of 5-amino-3-ethyl-1-(m-fluorophenyl)-4-pyrazolecarboxamide with stirring. After dissolution is complete, hydrochloric acid is added to adjust the pH to 5.5 and the volume is made up to 1,000 ml. with distilled water. The formulation is filtered through a 0.22 micron sterilizing filter, filled into 5.0 ml. ampoules, each containing 2.0 ml. (representing 40 mg. of drug), and sealed under nitrogen.

We claim:

1. A method of meliorating inflammation in a warm-blooded animal which comprises administering internally to said warm-blooded animal an effective amount of a phenylaminopyrazole compound selected from those of the formula:

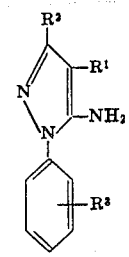

wherein $R^1$ is selected from the group consisting of carbamoyl and cyano; $R^2$ is selected from the group consisting of hydrogen and lower alkyl ($C_1$–$C_3$); $R^3$ is selected from the group consisting of hydrogen, fluoro, meta chloro, para chloro, meta bromo, ortho methyl, para methyl and meta nitro and non-toxic pharmaceutically acceptable acid addition salts thereof, in association with a pharmaceutically acceptable carrier.

2. The method in accordance with claim 1, in which the phenylaminopyrazole is 5-amino-3-ethyl-1-(m-fluorophenyl)-4-pyrazolecarboxamide.

3. The method in accordance with claim 1, in which the phenylaminopyrazole is 5-amino-1-(m-chlorophenyl)-3-ethyl-4-pyrazolecarboxamide.

4. The method in accordance with claim 1, in which the phenylaminopyrazole is 5-amino-1-phenyl-4-pyrazolecarbonitrile.

5. The method in accordance with claim 1, in which the phenylaminopyrazole is 5-amino-3-ethyl-1-phenyl-4-pyrazolecarboxamide.

6. The method in accordance with claim 1, in which the phenylaminopyrazole is 5-amino-1-(m-bromophenyl)-3-ethyl-4-pyrazolecarboxamide.

7. The method in accordance with claim 1, in which the phenylaminopyrazole is 5-amino-3-ethyl-1-phenyl-4-pyrazole carbonitrile.

8. The method in accordance with claim 1, in which the phenylaminopyrazole is 5-amino-3-ethyl-1-(o-fluorophenyl)-4-pyrazolecarboxamide.

* * * * *